United States Patent
Vogel et al.

(10) Patent No.: US 10,607,420 B2
(45) Date of Patent: Mar. 31, 2020

(54) METHODS OF USING AN IMAGING APPARATUS IN AUGMENTED REALITY, IN MEDICAL IMAGING AND NONMEDICAL IMAGING

(71) Applicant: DermaGenesis LLC, Pompano Beach, FL (US)

(72) Inventors: Richard Vogel, Miami, FL (US); Tony Xu, Miami, FL (US); Alexander Steinberg, Ra'anana (IL); Ran Cohen, Petah Tikva (IL)

(73) Assignee: DERMAGENESIS, LLC, Pompano Beach, FL (US)

( * ) Notice: Subject to any disclaimer, the term of this patent is extended or adjusted under 35 U.S.C. 154(b) by 8 days.

(21) Appl. No.: 16/116,211

(22) Filed: Aug. 29, 2018

(65) Prior Publication Data
US 2019/0066390 A1    Feb. 28, 2019

Related U.S. Application Data

(60) Provisional application No. 62/552,090, filed on Aug. 30, 2017.

(51) Int. Cl.
*G06T 19/20* (2011.01)
*G06T 19/00* (2011.01)
(Continued)

(52) U.S. Cl.
CPC ............ *G06T 19/20* (2013.01); *A63F 13/655* (2014.09); *G06K 9/3233* (2013.01); *G06T 5/005* (2013.01);
(Continued)

(58) Field of Classification Search
CPC ....................................................... G06T 19/20
(Continued)

(56) References Cited

U.S. PATENT DOCUMENTS

| | | | | |
|---|---|---|---|---|
| 5,923,329 A | * | 7/1999 | Beale | G06T 17/20 345/418 |
| 9,251,590 B2 | * | 2/2016 | Sharp | A63F 13/00 |

(Continued)

OTHER PUBLICATIONS

Vladislav Zorov, "Why there are not real pictures in computer games instead of only computer designed graphics?" www.quora.com/Why-there-are-not-real-pictures-in-compute . . . , Aug. 13, 2018.

(Continued)

*Primary Examiner* — Javid A Amini
(74) *Attorney, Agent, or Firm* — W & C IP

(57) ABSTRACT

With inventive processing making use of surface-reconstruction and capping steps, more imagery acquired by 3C cameras can be put to use in augmented reality applications, especially applications, such as medical reconstruction, in which a certain theoretical ideal fit might be wanted but can be difficult or seemingly impossible to achieve due to highly complex, irregular shapes, perimeters and surfaces involved. The inventive technology is especially useful for ongoing wound measurement and comparative analysis and characterization of a wound over time, as well as working with anatomical reconstruction. The inventive technology also extends to non-medical augmented reality applications, and provides robust data sets representing a range of real-world objects, such as zoo animals, family pets, etc. susceptible of being imaged and stored as robust data sets that provide better verisimilitude when used in gaming or other virtual-world contexts as compared to a raw data set from a camera.

10 Claims, 5 Drawing Sheets

(51) Int. Cl.

| | |
|---|---|
| *H04N 13/204* | (2018.01) |
| *G06T 7/13* | (2017.01) |
| *G06K 9/32* | (2006.01) |
| *G06T 7/50* | (2017.01) |
| *G06T 5/00* | (2006.01) |
| *A63F 13/655* | (2014.01) |
| *G06T 7/62* | (2017.01) |
| *H04N 13/111* | (2018.01) |

(52) U.S. Cl.
CPC .................. *G06T 7/13* (2017.01); *G06T 7/50* (2017.01); *G06T 7/62* (2017.01); *G06T 19/006* (2013.01); *H04N 13/204* (2018.05); *A63F 2300/695* (2013.01); *G06K 2209/05* (2013.01); *G06T 2207/10012* (2013.01); *G06T 2207/10028* (2013.01); *G06T 2207/30052* (2013.01); *G06T 2207/30088* (2013.01); *G06T 2207/30096* (2013.01); *G06T 2207/30196* (2013.01); *G06T 2210/41* (2013.01); *G06T 2219/024* (2013.01); *G06T 2219/2016* (2013.01); *H04N 13/111* (2018.05)

(58) Field of Classification Search
USPC .......................................................... 345/633
See application file for complete search history.

(56) References Cited

U.S. PATENT DOCUMENTS

| | | | | |
|---|---|---|---|---|
| 9,349,183 | B1* | 5/2016 | Douglas | G06T 7/593 |
| 10,010,379 | B1* | 7/2018 | Gibby | A61B 5/1075 |
| 10,019,628 | B1 | 7/2018 | Henderson | |
| 10,025,377 | B1 | 7/2018 | Bastide et al. | |
| 10,026,227 | B2 | 7/2018 | Laughlin et al. | |
| 10,026,228 | B2 | 7/2018 | Yuen et al. | |
| 10,032,225 | B1 | 7/2018 | Fox et al. | |
| 10,032,233 | B2 | 7/2018 | Papakipos et al. | |
| 10,046,232 | B2 | 8/2018 | Aoki et al. | |
| 10,049,494 | B2 | 8/2018 | Zhang et al. | |
| 10,049,499 | B2 | 8/2018 | Sisbot | |
| 10,049,500 | B2 | 8/2018 | Morrison | |
| 2005/0096515 | A1* | 5/2005 | Geng | A61N 5/1049 600/315 |
| 2006/0176242 | A1* | 8/2006 | Jaramaz | A61B 5/0059 345/7 |
| 2009/0316966 | A1* | 12/2009 | Marshall | A61B 6/5217 382/128 |
| 2011/0299361 | A1* | 12/2011 | Shin | G01V 1/28 367/21 |
| 2013/0335445 | A1* | 12/2013 | Bala | G06F 3/147 345/633 |
| 2013/0342527 | A1* | 12/2013 | Molyneaux | A63F 13/655 345/419 |
| 2015/0260474 | A1* | 9/2015 | Rublowsky | F41A 33/00 434/16 |
| 2016/0143524 | A1* | 5/2016 | Berard | A61B 3/103 351/206 |
| 2017/0119471 | A1* | 5/2017 | Winner | A61B 34/10 |
| 2018/0036641 | A1 | 2/2018 | Parisi | |
| 2018/0182121 | A1* | 6/2018 | Xu | G06T 7/13 |

OTHER PUBLICATIONS

T. Chan and L. Vese, Active contours without edges. IEEE Trans. Image Processing, 10(2):266-277, Feb. 2001.

* cited by examiner

METHODS OF USING AN IMAGING APPARATUS IN AUGMENTED REALITY, IN MEDICAL IMAGING AND NONMEDICAL IMAGING

FIELD OF THE INVENTION

The invention relates to augmented-reality technology.

BACKGROUND OF THE INVENTION

In an area of emerging technology, "augmented reality", a computer-generated image is superimposed on a user's view of the real world, thus providing a composite view. One context of augmented reality is in medicine and healthcare. See, e.g., Winner, et al., "Augmented Reality Imaging System for Cosmetic Surgical Procedures," US 20170119471, published May 4, 2017; Gibby, et al. (Novarad Corp.), "Augmented reality viewing and tagging for medical procedures," U.S. Pat. No. 10,010,379 issued Jul. 3, 2018.

Other contexts of augmented reality are outside of medicine or healthcare, such as in video gaming, virtual worlds, exercise and fitness, shopping/fashion, etc. See, e.g., Rublowsky, "Augmented Reality Simulator," US 20150260474, published Sep. 17, 2015; Parisi, "Fantasy Sport Platform with Augmented Reality Player Acquisition," US 20180036641, published Feb. 8, 2018; Henderson, "Incentivizing foodstuff consumption through the use of augmented reality features," U.S. Pat. No. 10,019,628 issued Jul. 10, 2018; Bastide, et al (IBM), "Avatar-based augmented reality engagement," U.S. Pat. No. 10,025,377 issued Jul. 17, 2018; Laughlin, (The Boeing Co.), "Portable augmented reality," U.S. Pat. No. 10,026,227 issued Jul. 17, 2018; Yuen, et al. (Intel Corp.), "Scene modification for augmented reality using markers with parameters," U.S. Pat. No. 10,026,228 issued Jul. 17, 2018; Fox, et al. (Liberty Mutual Ins. Co.), "Augmented reality insurance applications," U.S. Pat. No. 10,032,225 issued Jul. 24, 2018; Papkipos, et al. (Facebook, Inc.) "Social context in augmented reality," U.S. Pat. No. 10,032,233 issued Jul. 24, 2018; Aoki, et al. (Bally Gaming, Inc.), "Augmented reality for table games." U.S. Pat. No. 10,046,232 issued Aug. 14, 2018; Zhang, et al. (Tencent Technology), "Method and system for performing interaction based on augmented reality," U.S. Pat. No. 10,049,494 issued Aug. 14, 2018; Sisbot (Toyota), "Method of ground adjustment for in-vehicle augmented reality systems," U.S. Pat. No. 10,049,499 issued Aug. 14, 2018; Morrison (3D Product Imaging Inc.), "Augmented reality e-commerce for home improvement," U.S. Pat. No. 10,049,500 issued Aug. 14, 2018.

Techniques for acquiring images that might be useable and work in one context are not necessarily useful in another context, or may be too inaccurate or imprecise or prone to error, especially for medical and health care contexts. Various 3D imaging technology exists in medicine, but using relatively large equipment, and generally developed for diagnosis. Improvements in 3D imaging in a direction of acquiring images that will better work for augmented reality computer processing would be desirable.

To give one example, some imaging technology that has been proposed or attempted relies on color imaging, and an easy-to-use imaging device without the limitations and disadvantages of color-data processing could be advantageous.

SUMMARY OF THE INVENTION

The invention in one preferred embodiment provides an augmented reality method, comprising: operating an imaging device to acquire a 3D image; using the acquired 3D image, performing a detection algorithm that comprises capping or an interpolation method on a 2-dimensional grid in order to reconstruct a surface, wherein the step is performed by a computer or a processor and a surface reconstruction is generated; and, using the surface reconstruction, performing at least one augmented reality processing step, virtual reality processing step, authentic reality processing step, or mixed reality processing step, wherein the step is performed by a computer or a processor, such as, e.g. inventive methods wherein the acquired 3D image is an image of a wound, inventive methods wherein what is imaged in the device-operating step is other than a wound, inventive methods wherein a patient is imaged in the device-operating step, and the augmented reality is in a medical context, inventive methods wherein the acquired 3D image is of a non-wound, and the augmented reality is in a non-medical, non-health care context; inventive methods wherein a real animal (such as, e.g., a farm animal, a household pet, a zoo animal, etc.) is imaged, and the image is imported into a game; inventive methods wherein a body part is imaged; inventive methods wherein a healthy body part is imaged, and the image of the healthy body part is processed to construct an image of a proposed prosthesis and/or to construct prosthesis; inventive methods wherein the processing step is in gaming; inventive methods wherein the operating step is performed to image a patient in a first geography, and wherein the 3D image is simultaneously accessible to both a first medical doctor in a second geography and a second medical doctor in a third geography, wherein the first geography, second geography and third geography are remote from each other; inventive methods further comprising a step of expanding the 3D image; inventive methods further comprising a step of subjecting the 3D image to contrasting; inventive methods wherein the capping is an interpolation method on a 2D grid in order to "reconstruct" a skin surface; inventive methods comprising a step of solving a Laplace equation with Dirichlet boundary conditions; inventive methods wherein the method steps exclude any RGB data processing having been performed and without any other color-information data processing having been performed; inventive methods further comprising, using the acquired 3D image, performing a detection algorithm that comprises capping or an interpolation method on a 2-dimensional grid in order to reconstruct a surface; inventive methods further comprising performing steps of acquiring an image, previewing video images and selecting an Object, aiming at the center of the Object, at least one Object Scan step and at least one Object Detection step (such as, e.g. wherein the at least one Object Detection step comprises automatic detection of Object borders in the 3D depth image, Object capping and calculating an Object measurement); inventive methods further comprising rendering the 3D Object model from a perpendicular camera and generating a Z-buffer, converting the Z-buffer to depth image, defining a region of interest U for Object detection, Object capping, detecting rough Object boundaries and detecting refined Object boundaries; and other inventive methods.

DETAILED DESCRIPTION OF THE INVENTION

Figure 1:
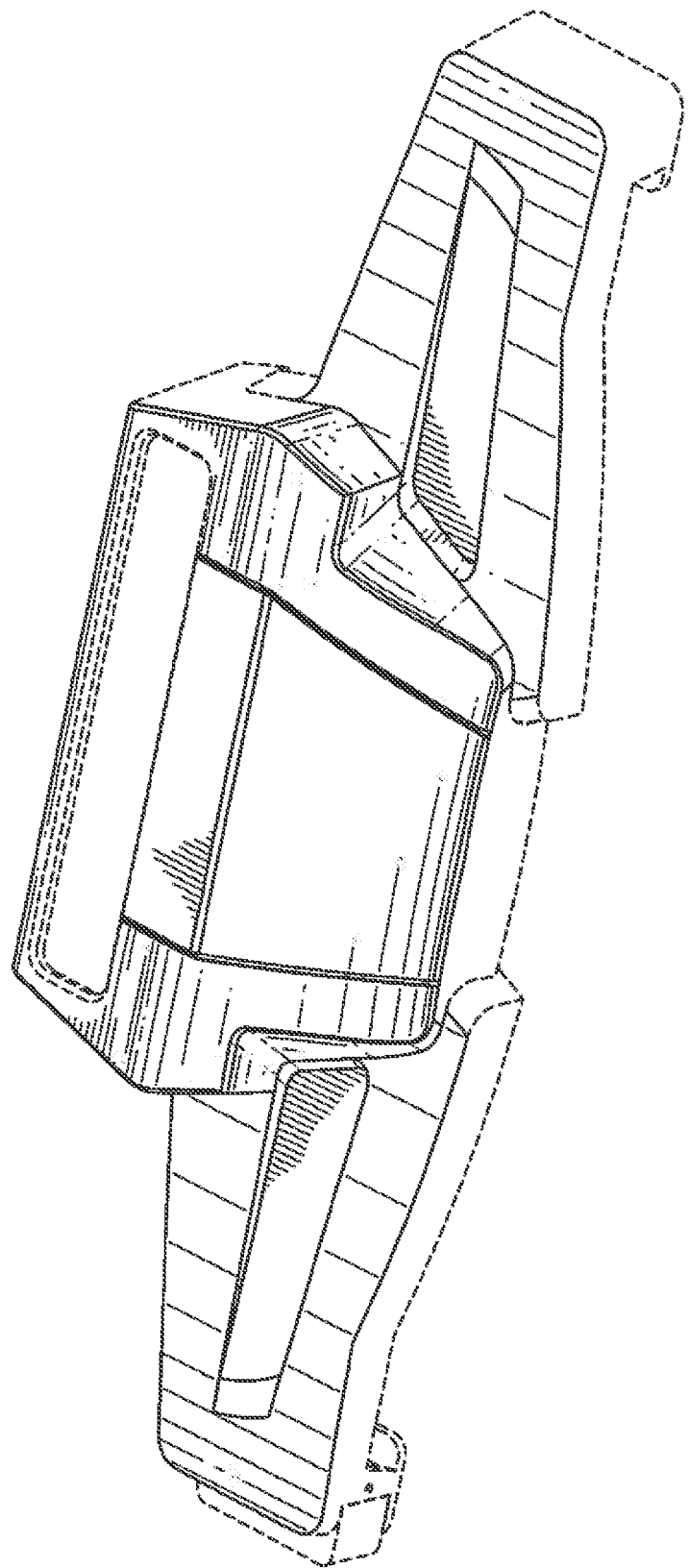
FIG. 1 is a perspective view of an exemplary augmented-reality device into which can be fitted a commercially-available 3D camera (not shown), and having incorporated therein at least one processor that performs inventive methodology.

An imaging device according to the invention is useable to acquire 3D images that can be subjected to computer processing steps such as in virtual reality technology, authentic reality technology, mixed reality technology, augmented reality technology, etc.

A significant advantage of the inventive technology is its usefulness in connection with a patient who suffers from a wound, to compute a Wound Volume Measurement, advantageously without any ruler, grid, marker (or such physical object) needing to have been placed on, or near, the patient (particularly, onto the patient wound or onto skin near the patient wound). For patient-related usages, the invention mainly contemplates a human patient, but also can be used in connection with a veterinary patient.

The inventive technology further is useable in connection with imaging a range of real-world objects and real-world living beings without any physical object needing to have been placed on, or near, the real-world object or living being. Post-imaging steps vary depending on what was imaged and on the application, such as a gaming application, a limb reconstruction application, etc.

We sometimes refer herein to "touchless", by which we mean that the patient's wound and the wound's environ (or, in other embodiments, the real-world object or real-world living being) is untouched by any ruler, grid, marker, 3D camera, frame enclosure holding a 3D camera, or the like. For example, the inventive technology is useable to image a zoo animal from a safe distance, and the resulting imaged zoo animal is then useable, for example, in a game.

In one embodiment, an inventive augmented reality method comprises steps of: operating an imaging device to acquire a 3D image; using the acquired 3D image, performing a detection algorithm that comprises capping or an interpolation method on a 2-dimensional grid in order to reconstruct a surface; and performing at least one augmented reality processing step, virtual reality processing step, authentic reality processing step, or mixed reality processing step.

In the step of operating an imaging device to acquire a 3D image, examples of what is being imaged are, e.g., a real-world wound, a real-world object, a real-world living being.

In the step of operating an imaging device to acquire a 3D image, a preferred example of an imaging device is a 3D camera. Examples of a 3D camera for use in practicing the invention are, e.g., Real Sense 3D camera (manufactured by Intel); Orbbec Astra 3-D camera; ZED stereo 3-D camera by Stereolabs.

The invention may further be appreciated with reference to the following examples, without the invention being limited to these examples.

Example 1

An imaging device according to this inventive Example is useable to acquire 3D images that can be subjected to computer processing steps. For example, an imaging device that we call "Presero" was constructed according to this example.

Example 1.1

An imaging device was constructed as follows, according to a novel algorithm that consists of two main parts: wound detection and wound measurement.

The algorithm applies to a 3D model of a human body part containing a wound. The 3D model is obtained from a scan performed by an inventive application. The algorithm is not applied directly to the 3D model. Instead, the generated 3D model is rendered with camera parameters providing a good view of the wound (typically perpendicular to the wound or to the body part where the wound is), from which the algorithm acquires the Z-buffer (depth map) Z, calculated by the rendering process and the corresponding 4-by-4 projection matrix P as an input. The rendering process is based on OpenGL API (The Industry Standard for High Performance Graphics), and hence we use here the OpenGL terminology.

In addition, the algorithm gets a user defined outer-wound contour C as a hint for the wound location.

The algorithm does NOT use any color information.

Wound Detection

The following steps are performed.

1. Convert the Z-Buffer Z to the Depth Image D.

The conversion is given by:

$$D(i, j) = \frac{P(3, 4)}{2Z(i, j) - 1 + P(3, 3)}, (i, j) \in R,$$

where $R=\{1, \ldots, m\} \times \{1, \ldots, n\}$, m is a number of rows and n is a number of columns in Z and D.

2. Define a Region of Interest U for Wound Detection.

We include in U all $(i,j) \in R$ laying inside C, except border pixels (i=1 or i=m or j=1 or j=n) and except pixels which depth is too close to the far parameter of P, i.e., $$D(i,j) > (1-\alpha)P(3,4)/(P(3,3)+1),$$

where $\alpha$ is a small positive constant.

3. Wound Capping.

We reconstruct skin surface S over the wound in order to enhance wound appearance by subtracting S from D.

(a) Calculate the First Approximation.

Since wound boundary is unknown yet, we start from the region U. Namely, we solve the following discrete Laplace equation with respect to S $$4S(i,j)-S(i-1,j)-S(i+1,j)-S(i,j-1)-S(i,j+1)=0$$

if $(i,j) \in U$, and $$S(i,j)=D(i,j)$$

if $(i,j) \in R \setminus U$.

(b) Iteratively Raise the Capping if Required.

There is a possibility that the surface S is situated below the wound boundary. In this case S has to be raised. Let h be a maximum value of S−D. If, for some small tolerance threshold $\delta > 0$ h$> \delta$, then we find all pixels $(i,j) \in U$ such that $$S(i,j)-D(i,j) \geq h-\delta.$$

Assuming that these pixels are mostly (up to the threshold $\delta$) outside the wound we redefine the region U by excluding these pixels from it. We return to the steps (3a) and (3b) with the updated region U. We proceed in this way until $h \leq \delta$ or maximal allowed number of iterations is reached.

4. Detect a Wound.

To detect a wound we apply Chan-Vese algorithm (see T. Chan and L. Vese, Active contours without edges. IEEE Trans. Image Processing, 10 (2):266-277, February 2001) to the difference F=D−S. The Chan-Vese approach is to find among all 2-valued functions of the form $$\phi(i, j) = \begin{cases} c_1 \text{ if } (i, j) \in W, \\ c_2 \text{ if } (i, j) \in R \setminus W, \end{cases}$$

the one that minimizes the following energy functional, $$\mu \text{Length}(\partial W) + \nu \text{Area}(W) + \lambda_1 \Sigma_{(i,j) \in W}(F(i,j) - c_1)^2 + \lambda_2 \Sigma_{(i,j) \in R \setminus W}(F(i,j) - c_2)^2,$$

where $\partial W$ denotes the boundary of W, $\mu > 0$, $\nu \geq 0$, $\lambda_1 > 0$, $\lambda_2 > 0$ are fixed parameters.

Let W, $c_1$ and $c_2$ minimize the energy functional. We interpret W as a set of pixels belonging to the wound.

5. Correct Wound Boundary.

The wound boundary $\partial W$ obtained in (4) is not accurate enough. It is located somewhere on the wound walls, but not necessarily on the top of them. We move it to the top as described below.

Starting from each pixel $(i,j) \in \partial W$ we go in the direction orthogonal to $\partial W$ and select a pixel $(p(i,j), q(i,j))$ located on the top of the wound wall by searching for the maximum value of the directional second derivative of the depth image D. Our intention is to move pixels $(i,j)$ to pixels $(p(i,j), q(i,j))$, but this operation can break continuity of the wound boundary.

Denote by $\text{dist}(i,j,A)$ the euclidean distance from the pixel $(i,j)$ to the set of pixels A. Let $$\Delta(i,j) = \text{dist}(i,j,W) - \text{dist}(i,j,R \setminus W).$$

For any $t > 0$, the set $W_t = \{(i,j) \in R : \Delta(i,j) < t\}$ is an uniform expansion of W with size controlled by t, $W_0 = W$. In order to make this kind of expansion more flexible we replace t with a function $T(i,j)$ which on the one hand has to be close to a constant, and on the other hand has to get values close to $\text{dist}(p(i,j), q(i,j), W)$ at the pixels $(p(i,j), q(i,j))$.

We find T as the solution of the following optimization problem $$\Sigma_{i=2}^m \Sigma_{j=1}^n [T(i,j) - T(i-1,j)]^2 + \Sigma_{i=1}^m \Sigma_{j=2}^n [T(i,j) - T(i,j-1)]^2 + \rho \Sigma_{(i,j) \in \partial W} [T(p(i,j), q(i,j)) - \text{dist}(p(i,j), q(i,j), W)]^2 \to \min,$$

where $\rho > 0$ is a constant parameter. Finally, we declare $$W^* = \{(i,j) \in R : \Delta(i,j) \leq T(i,j)\}$$

as a set of the wound pixels,

Wound Measurements

Formulas for calculating wound volume, maximal depth, area, perimeter, length and width are set forth below. Note that the last 4 measurements are calculated for wound projection onto a plane parallel to the camera image plane.

In order to calculate wound volume we perform capping again as described in (3a) using W* instead of U. Let S* be the result. We clamp it as follows $$S^* = \min(S^*, D).$$

Then $$WoundVolume = \frac{4}{3mnP(1,1)P(2,2)} \cdot \sum_{(i,j) \in W} (D(i,j)^3 - S^*(i,j)^3),$$

$$WoundMaximalDepth = \max\{D(i,j) - S^*(i,j), (i,j) \in W^*\}.$$

Tracing the wound boundary $\partial W^*$ we write down all pixels belonging to $\partial W^*$ as a sequence $(i_1,j_1), (i_2,j_2), \ldots, (i_N,j_N)$. Let Q be the inverse matrix of P and let for each $k=1, \ldots, N$, $$X_k = \frac{Q(1,1)x_k + Q(1,4)}{Q(4,3)z_k + Q(4,4)},$$

$$Y_k = \frac{Q(2,2)y_k + Q(2,4)}{Q(4,3)z_k + Q(4,4)},$$

where $$x_k = (2/n)(j_k - 0.5) - 1,$$

$$y_k = -(2/m)(i_k - 0.5) + 1,$$

$$z_k = -P(3,3) + \frac{P(3,4)}{D(i_k, j_k)}.$$

Put, in addition, $X_0 = X_N, Y_0 = Y_N$ and $Y_{N+1} = Y_1$. Then $$WoundArea = |\Sigma_{k=1}^N X_k (Y_{k+1} - Y_{k-1})|,$$

$$WoundPerimeter = \Sigma_{k=1}^N \sqrt{(X_k - X_{k-1})^2 + (Y_k - Y_{k-1})^2}.$$

Assuming that a human body orientation is defined by an angle $\theta$, wound length and width are given by $$WoundLength = \max\{X_k \cos \theta + Y_k \sin \theta, 1 \leq k \leq N\} - \min\{X_k \cos \theta + Y_k \sin \theta, 1 \leq k \leq N\},$$

$$WoundWidth = \max\{-X_k \sin \theta + Y_k \cos \theta, 1 \leq k \leq N\} - \min\{-X_k \sin \theta + Y_k \cos \theta, 1 \leq k \leq N\}.$$

REFERENCES

1. T. Chan and L. Vese, Active contours without edges. IEEE Trans. Image Processing, 10 (2):256-277, February 2001.

Example 1A

Optimal values for algorithm parameters in Example 1 are determined by testing the system on phantom wounds and other forms made from plasticine. For $\alpha$ (a small positive constant), 0.01 was chosen.

Example 1B

In this example, when an inventive device used according to an above example, an image was ready to view within 10 seconds of camera operation.

Example 1C

In this example, when an inventive device was used according to an above example, after a scan was completed, a 3D image was displayed to a user, and the displayed 3D image was subject to being manipulated by a finger of the user.

Example 1D

In this example according to Example 1C, a user manipulated a wound image on screen with the user's finger, including, the user looked behind and under a wound image on screen.

Example 1E

Figure 2:
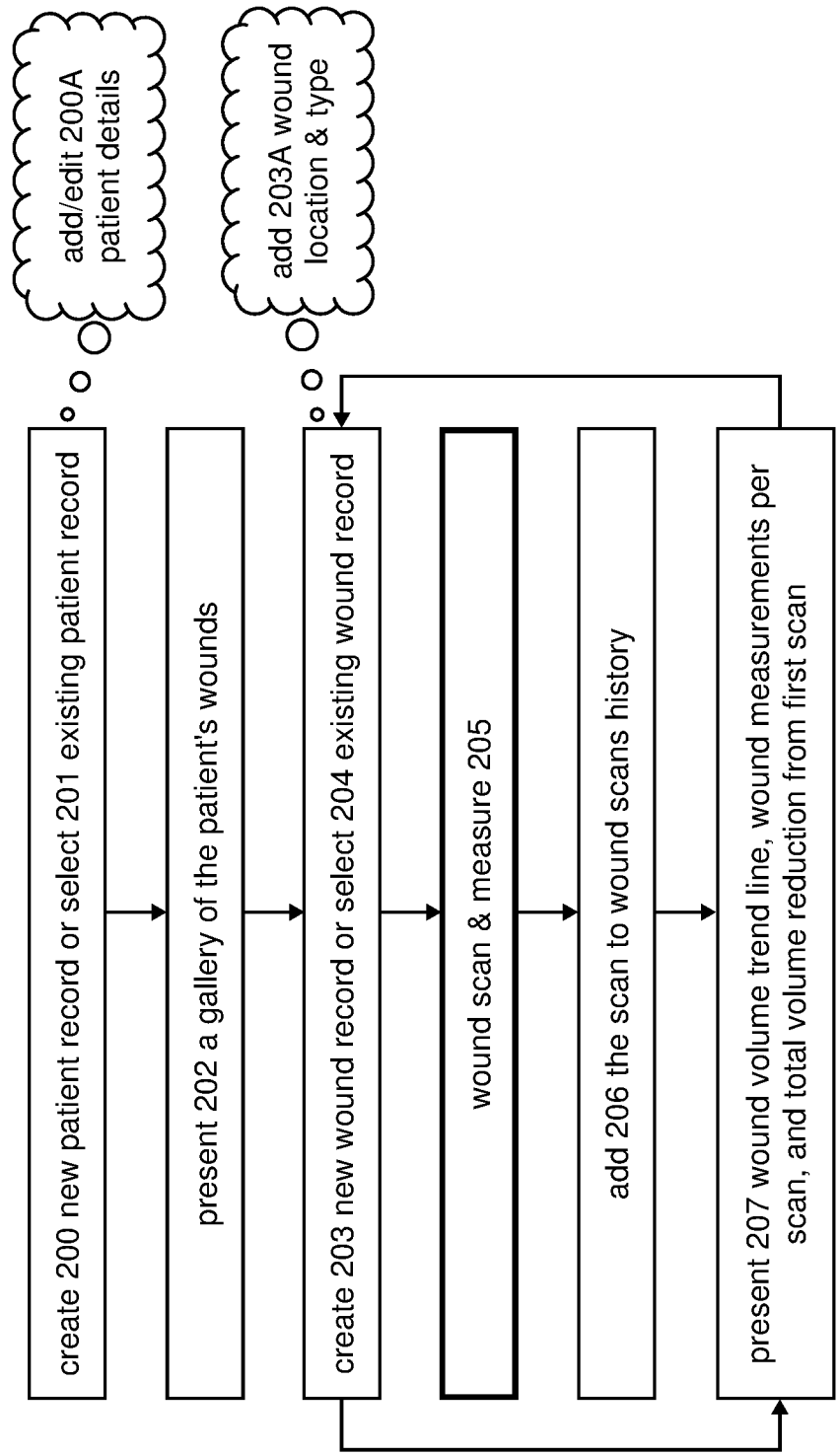
FIG. 2 is a flow chart of method steps in an inventive embodiment of wound measurement technology using computerized records-keeping.

Referring to FIG. 2, in this Example, method steps are performed of: creating 200 a New Patient record or selecting 201 an Existing Patient record; presenting 202 a gallery of the patient's wounds; creating 203 a new Wound record or selecting 204 an existing Wound record; performing Wound Scan & Measurement 205; adding 206 the scan to Wound Scans History; presenting 207 Wound Volume trend line, Wound Measurement Per Scan, and Total Volume Reduction from first scan.

Example 1F

Referring to FIG. 2, optionally steps of adding 203A wound location and type (to the Wound Record, and/or adding/editing 200A patient details to the Patient Record, are performed.

Example 1F

Wound Scan & Measurement

Figure 3:
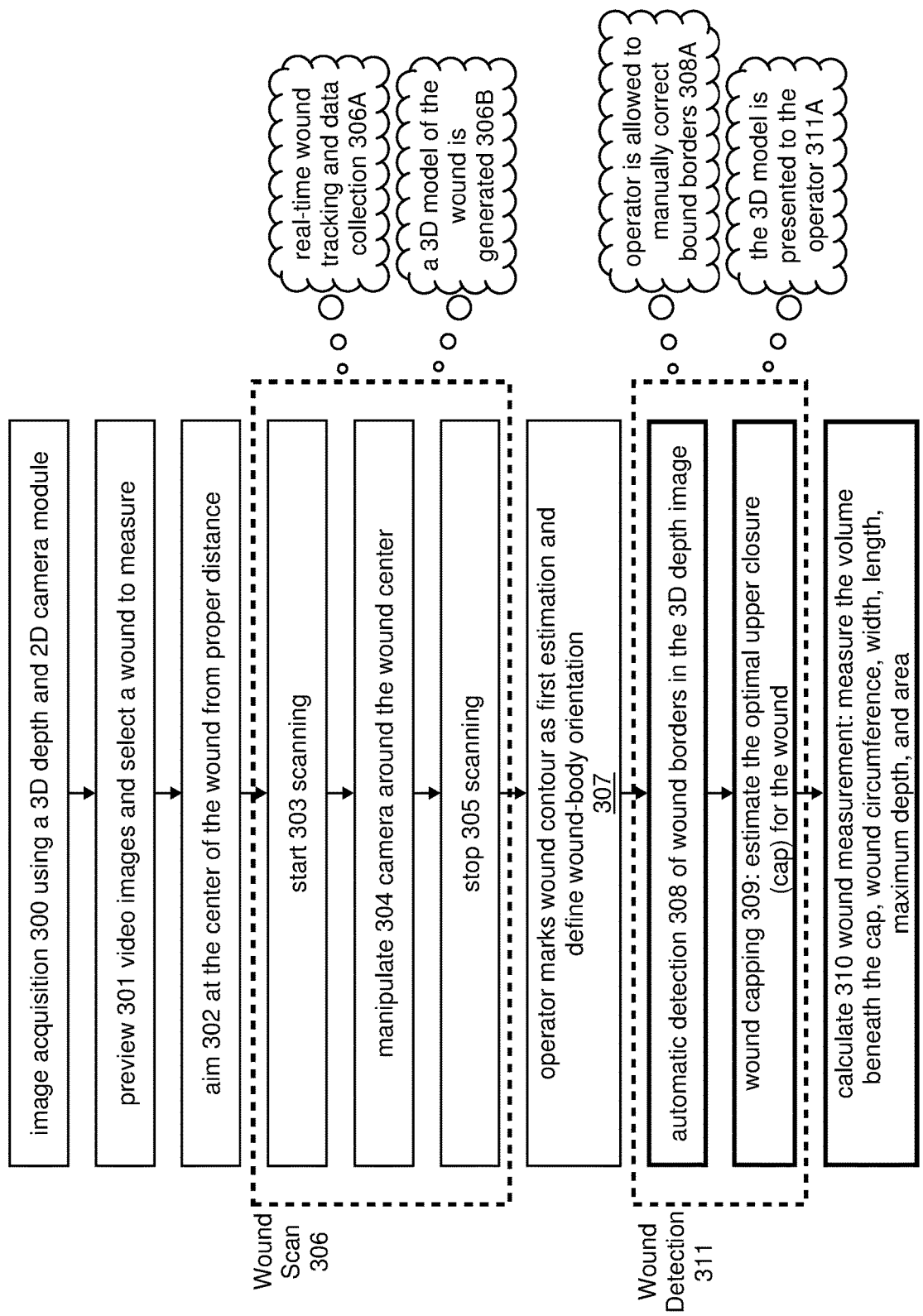
FIG. 3 is a flow chart of method steps in an inventive embodiment of wound scan and measurement.

Referring to FIG. 3, in this Example, method steps are performed of: Image Acquisition 300 using a 3D depth and 2D camera module; previewing 301 video images and selecting a wound to measure; aiming 302 at the center of the wound, from a proper distance; starting 303 scanning; manipulating 304 the camera around the wound center; stopping 305 scanning; a step 307, performed by an operator, of marking a wound contour as a first estimation and defining wound-body orientation; automatic detection 308 of wound borders in the 3D depth image; wound capping 309 (comprising estimating the optimal upper closure (i.e., cap) for the wound); calculating 310 wound measurement (comprising measuring the volume beneath the cap, wound circumference, width, length, maximum depth, and area).

Steps 303, 304, 305 are referred to as Wound Scan 306 steps.

Steps 308, 309, 310 are referred to as Wound Detection 311 steps.

Example 1G

Referring to FIG. 3, optionally the operator is allowed to manually correct 308A bound borders.

Example 1H

Referring to FIG. 3, optionally real-time wound tracking and data collection are output in an outputting step 306A.

Example 1I

Referring to FIG. 3, optionally a 3D model of the wound is generated in a generating step 306B.

Example 1J

Referring to FIG. 3, optionally the 3D model of Example 2.8B is presented to the operator in a displaying step 311A.

Example 1K

Wound Detection

Figure 4:
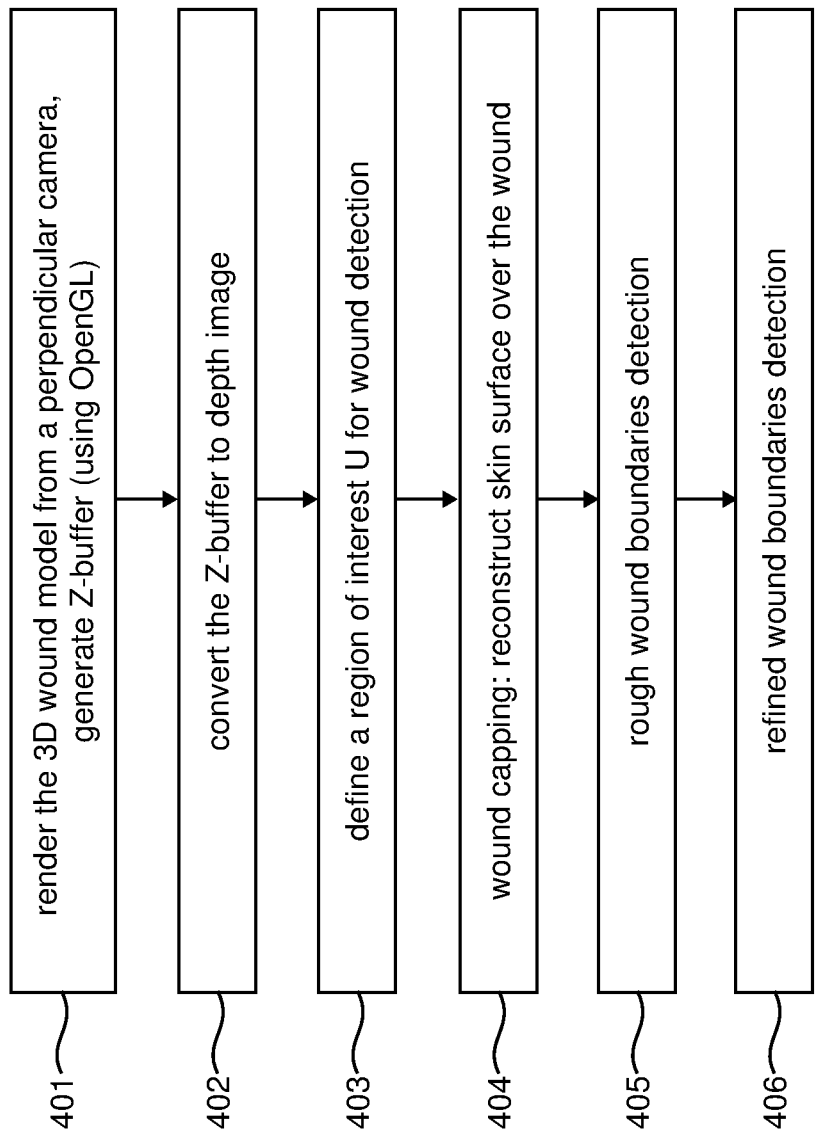
FIG. 4 is a flow chart of method steps in an inventive embodiment of wound detection.

Referring to FIG. 4, in this Example, steps are performed of: a step 401 of rendering the 3D wound model from a perpendicular camera and generating Z-buffer (using OpenGL); converting 402 the Z-buffer to depth image; defining 403 a region of interest U for wound detection; wound capping 404 (comprising reconstructing skin surface over the wound); rough wound boundaries detection 405; and refined wound boundaries detection 406.

Example 1L

Wound Measurements

Figure 5:
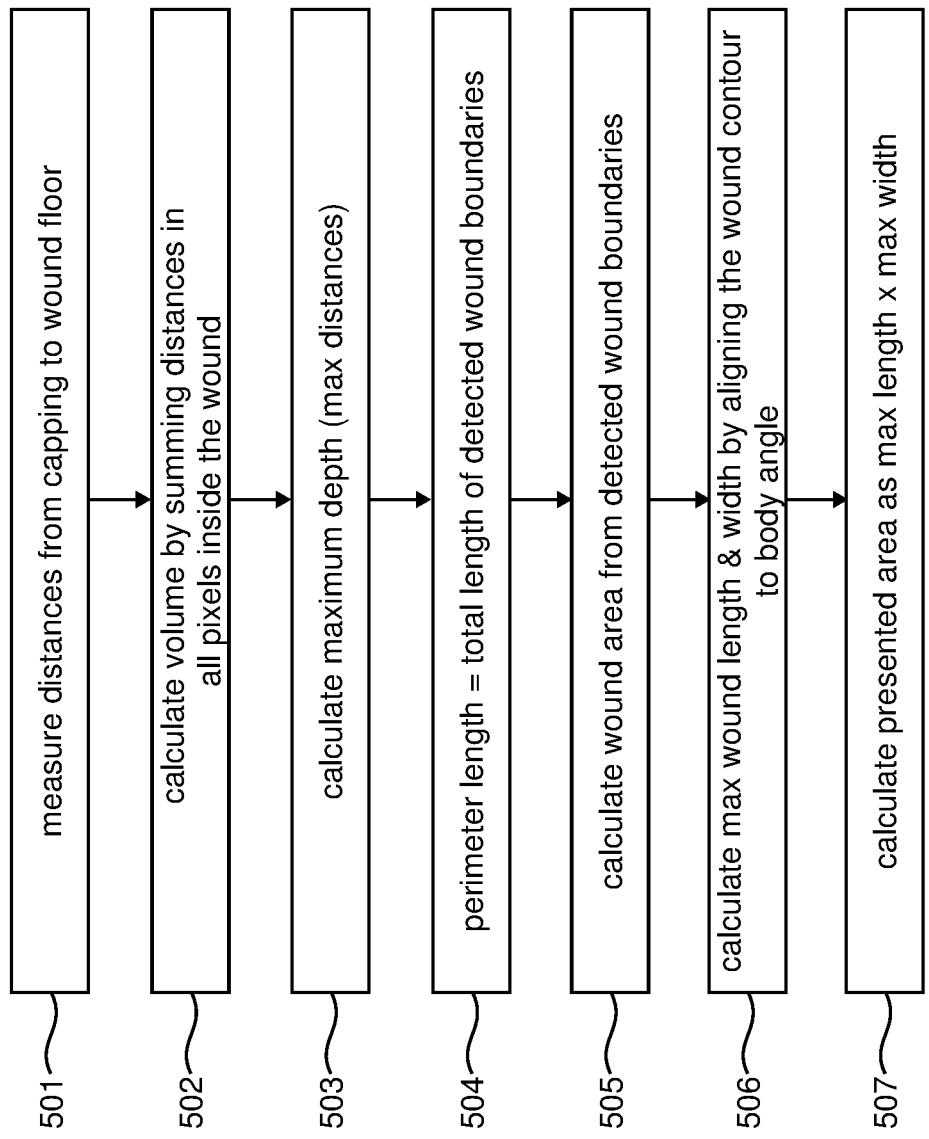
FIG. 5 is a flow chart or method steps in an inventive embodiment of wound measurements.

Referring to FIG. 5, in this Example, steps are performed of: measuring 501 distances from capping to wound floor; calculating 502 volume by summing distances in all pixels inside the wound; calculating 503 maximum depth (max distances); summating 504 perimeter length equaling total length of detected wound boundaries; calculating 505 wound area from detected wound boundaries; calculating 506 max wound length & width by aligning the wound contour to body angle; and calculating 507 presented area as Max length×Max width.

Example 2

In this example, an imaging device of Examples 1-1A is used to image something other than a wound.

Example 3

In this example, when an imaging device was used according to any of Examples 1-2, an image was ready to view within 10 seconds of camera operation.

Example 4

In this example, when an imaging device was used according to any of Examples 1-3, after a scan was completed, a 3D image was displayed to a user, and the displayed 3D image was subject to being manipulated by a finger of the user.

Example 4A

In this example according to Example 4, a user manipulated a wound image on screen with the user's finger, including to look behind and under a wound image on screen.

Example 5

An imaging device for imaging an Object which may be other than a wound is constructed. A 3D model of the Object is obtained from a scan performed by the imaging application. The algorithm is not applied directly to the 3D model. Instead, the generated 3D model is rendered with camera parameters providing a good view of the Object (typically perpendicular to the Object or to the region where the Object is), from which the algorithm acquires the Z-buffer (depth map) Z, calculated by the rendering process and the corresponding 4-by-4 projection matrix P as an input. The rendering process is based on OpenGL API.

In addition, the algorithm gets a user defined outer-Object contour C as a hint for the Object location.

Example 5.1 (Object Detection)

This Object-Detection part of the algorithm is represented by the following steps.
1. Convert the Z-buffer Z to the Depth Image D.
   The conversion is given by $$D(i, j) = \frac{P(3, 4)}{2Z(i, j) - 1 + P(3, 3)}, (i, j) \in R,$$

Where $R=[1, \ldots, m] \times [1, \ldots, n]$, m is a number of rows and n is a number of columns in Z And D.
2. Define a Region of Interest U for Object Detection.
   We include in U all $(i,j) \in R$ laying inside C, except border pixels ($i=1$ or $i=m$ or $j=1$ or $j=n$) and except pixels which depth is too close to the far parameter of P, i.e., $$D(i,j) > (1-\alpha)P(3,4)/(P(3,3)+1),$$

Where $\alpha$ is a small positive constant.
3. Object Capping.
   We reconstruct skin surface S over the Object in order to enhance Object appearance by subtracting S from D.
   (a) Calculate the First Approximation.
   Because Object boundary is unknown yet, we start from the region U. Namely, we solve the following discrete Laplace equation with respect to S $$4S(i,j)-S(i-1,j)-S(i+1,j)-S(i,j-1)-S(i,j+1)=0$$

if $(i,j) \in U$, and $$S(i,j)=D(i,j)$$

if $(i,j) \in R \setminus U$.
   (b) Iteratively Raise the Capping if Required.
   There is a possibility that the surface S is situated below the Object boundary. In this case S has to be raised. Let h be a maximum value of S−D. If, for some small tolerance threshold $\delta > 0$ $h > \delta$, then we find all pixels $(i,j) \in U$ such that $$S(i,j)-D(i,j) \geq h-\delta.$$

Assuming that these pixels are mostly (up to the threshold $\delta$) outside the Object we redefine the region U by excluding these pixels from it. We return to the steps (3a) and (3b) with the updated region U. We proceed in this way till $h \leq \delta$ or maximal allowed number of iterations is reached.
4. Detect an Object.
   To detect an Object we apply Chan-Vese algorithm [1] to the difference $F=D-S$. The Chan-Vere approach is to find among all 2-valued functions of the form $$\phi(i, j) = \begin{cases} c_1 \text{ if } (i, j) \in W, \\ c_2 \text{ if } (i, j) \in R \setminus W \end{cases}$$

the one that minimizes the following energy functional, $$\mu \text{Length}(\partial W) + \nu \text{Area}(W) + \lambda_1 \Sigma_{(i,j) \in W}(F(i,j)-c_1)^2 + \lambda_2 \Sigma_{(i,j) \in R \setminus W}(F(i,j)-c_2)^2,$$

Where $\partial W$ denotes the boundary of W, $\mu \geq 0$, $\nu \geq 0$, $\lambda_1 > 0$, $\lambda_2 > 0$ are fixed parameters.

Let W, $c_1$ and $c_2$ minimize the energy functional. We interpret W as a set of pixels belonging to the wound.
5. Correct Object Boundary.
   The Object boundary $\partial W$ obtained in (4) is not accurate enough. It is located somewhere on the Object walls, but not necessarily on the top of them. We move it to the top as described below.
   Starting from each pixel $(i,j) \in \partial W$ we go in the direction orthogonal to $\partial W$ and select a pixel $(p(i,j), q(i,j))$ located on the top of the wound wall by searching for the maximum value of the directional second derivative of the depth image D. Our intention is to move pixels $(i,j)$ to pixels $(p(i,j), q(i,j))$, but this operation can break continuity of the Object boundary.
   Denote by $\text{dist}(i,j,A)$ the euclidean distance from the pixel $(i,j)$ to the set of pixels A. Let $$\Delta(i,j)=\text{dist}(i,j,W)-\text{dist}(i,j,R \setminus W).$$

For any $t>0$, the set $W_t=\{(i,j) \in R : \Delta(i,j) < t\}$ is an uniform expansion of W with size controlled by t, $W_0=W$. In order to make this kind of expansion more flexible we replace t with a function $T(i,j)$ which on the one hand has to be close to a constant, and on the other hand has to get values close to $\text{dist}(p(i,j), q(i,j),W)$ at the pixels $(p(i,j), q(i,j))$.

We find T as the solution of the following optimization problem $$\Sigma_{i=2}^{m}\Sigma_{j=1}^{n}[T(i,j)-T(i-1,j)]^2+\Sigma_{i=1}^{m}\Sigma_{j=2}^{n}[T(i,j)-T(i,j-1)]^2+\rho\Sigma_{(i,j) \in W}[T(p(i,j),q((i,j))=\text{dist}(p(i,j),q(i,j),W)]^2 \rightarrow \min,$$

where $\rho>0$ is a constant parameter. Finally, we declare $$W^*=\{(i,j) \in R : \Delta(i,j) \leq T(i,j)\}$$

as a set of the Object pixels.

Example 5.2

Object Measurements

In this part we present formulas for calculating Object volume, maximal depth, area, perimeter, length and width. The last 4 measurements are calculated for Object projection onto a plane parallel to the camera image plane.

In order to calculate Object volume we perform capping again as described in (3a) using $W^*$ instead of U. Let $S^*$ be the result. We clamp it as follows $$X_k = \frac{Q(1, 1)x_k + Q(1, 4)}{Q(4, 3)z_k + Q(4, 4)},$$

Tracing the Object boundary $\partial W^*$ we write down all pixels belonging to $\partial W^*$ as a sequence $(i_1,j_1), (i_2,j_2), \ldots, (i_N,j_N)$. Let Q be the inverse matrix of P and let for each $k=1, \ldots, N$, $$S^* = \min(S^*, D).$$

Then $$\text{Object Volume} = \frac{4}{3mnP(1, 1)P(2, 2)} \cdot \sum_{(i,j) \in W} .(D(i, j)^3 - S^*(i, j)^3),$$

$$\text{Object MaximalDepth} = \max\{D(i, j) - S^*(i, j), (i, j) \in W^*\}.$$

$$Y_k = \frac{Q(2,2)y_k + Q(2,4)}{Q(4,3)z_k + Q(4,4)},$$

where $$x_k = (2/n)(j_k - 0.5) - 1,$$

$$y_k = -(2/m)(i_k - 0.5) + 1,$$

$$z_k = -P(3,3) + \frac{P(3,4)}{D(i_k, j_k)}.$$

Put, in addition, $X_0 = X_N$, $Y_0 = Y_N$ and $Y_{N+1} = Y_1$.
Then

ObjectArea=$|\Sigma_{k=1}^N X_k(Y_{k+1} - Y_{k-1})|$,

ObjectPerimeter=$\Sigma_{k=1}^N \sqrt{(X_k - X_{k-1})^2 + (Y_k - Y_{k-1})^2}$.

Assuming that a Locality orientation is defined by an angle θ, Object length and width are given by ObjectLength=max$\{X_k \cos θ + Y_k \sin θ, 1 \leq k \leq N\}$ − min$\{X_k \cos θ + Y_k \sin θ, 1 \leq k \leq N\}$, ObjectWidth=max$[-X_k \sin θ + Y_k \cos θ, 1 \leq k \leq N]$ − min$[-X_k \sin θ + Y_k \cos θ, 1 \leq k \leq N]$.

Example 5.3

An example of an Object in Example 5.1 (Object Detection) above is an intact body part that is being 3D-imaged and the 3D image is processed in at least one prosthesis-modeling or prosthesis-construction steps.

The above described embodiments are set forth by way of example and are not limiting. It will be readily apparent that obvious modification, derivations and variations can be made to the embodiments. The claims appended hereto should be read in their full scope including any such modifications, derivations and variations.

What is claimed is:

1. An augmented or virtual reality method of wound imaging and reconstruction, comprising:
    operating an imaging device to acquire a 3D image of a wound that is real;
    producing a depth image from the 3D image;
    detecting a wound from the depth image, including
        producing a preliminary wound boundary formed of pixels,
        producing a final wound boundary from the preliminary wound boundary, including, for each pixel in the preliminary wound boundary,
            searching for a maximum value of a directional second derivative of the depth image along a direction orthogonal to the preliminary wound boundary,
            setting a pixel of the final wound boundary to coordinates corresponding with the maximum value, subject to a size control function to avoid breaking continuity of the final wound boundary; and
    using the final wound boundary, performing at least one augmented reality processing step, virtual reality processing step, authentic reality processing step, or mixed reality processing step, wherein the step is performed by a computer or a processor.

2. The method of claim 1, wherein the operating step comprises imaging a human patient.

3. The method of claim 1, wherein the operating step comprises imaging a real animal.

4. The method of claim 3, wherein the real animal is selected from the group consisting of: a farm animal; a household pet; a zoo animal.

5. The method of claim 1, wherein the operating step is performed to image a patient in a first geographic location, and wherein the 3D image is simultaneously accessible to both a first medical professional in a second geographic location and a second medical professional in a third geographic location, wherein the first geographic location, second geographic location, and third geographic location are remote from each other.

6. The method of claim 1, comprising a step of solving a Laplace equation with Dirichlet boundary conditions.

7. The method of claim 1, wherein the method steps exclude any RGB data processing having been performed and without any other color-information data processing having been performed.

8. The method of claim 1, further comprising constructing a virtual skin surface using the acquired 3D image using capping or an interpolation method on a 2-dimensional grid.

9. The method of claim 1, further comprising calculating a measurement from the final wound boundary.

10. The method of claim 1, further comprising:
    generating a Z-buffer, wherein the depth image is produced by a conversion of the Z-buffer;
    defining a region of interest U for the wound detection step.

* * * * *